United States Patent [19]

Purves et al.

[11] 3,917,866

[45] Nov. 4, 1975

[54] DECREASING THE RETROGRADED STARCH LEVEL AND INCREASING THE REHYDRATION RATE OF DEHYDRATED POTATO GRANULES

[75] Inventors: Edward Robert Purves, Forest Park; Charles Oscar Snively, Green Township, Hamilton County, both of Ohio

[73] Assignee: The Procter & Gamble Company, Cincinnati, Ohio

[22] Filed: Dec. 19, 1973

[21] Appl. No.: 426,161

Related U.S. Application Data

[63] Continuation of Ser. No. 158,235, June 30, 1971, abandoned.

[52] U.S. Cl. ............... 426/457; 426/456; 426/506; 426/637; 127/71
[51] Int. Cl.² ............................................ A23B 4/04
[58] Field of Search ........... 426/456, 455, 467, 465, 426/464, 473, 453, 470, 137, 141, 142, 147, 148, 205, 457, 506, 509

[56] References Cited

UNITED STATES PATENTS

| | | | |
|---|---|---|---|
| 3,021,223 | 2/1962 | Eskew | 426/453 |
| 3,021,224 | 2/1962 | Stagmeier | 426/137 |
| 3,085,019 | 4/1963 | Kueneman | 426/148 |
| 3,459,562 | 8/1969 | Beck | 426/470 |
| 3,468,673 | 9/1969 | Keller | 426/205 |

OTHER PUBLICATIONS

Food Dehydration, Copley; Van Arsdel, Vol. II, Aui Publishing Co., Westport, Conn., 1964, pp. 364–365.

*Primary Examiner*—Norman Yudkoff
*Assistant Examiner*—Martin G. Mullen

[57] ABSTRACT

The retrograded starch level of potato granules is decreased simultaneously with an increase in the rehydration rate of dehydrated potato granules by a process comprising mixing granules and hot water to provide a reconstituted mixture and rapidly drying that mixture.

5 Claims, 1 Drawing Figure

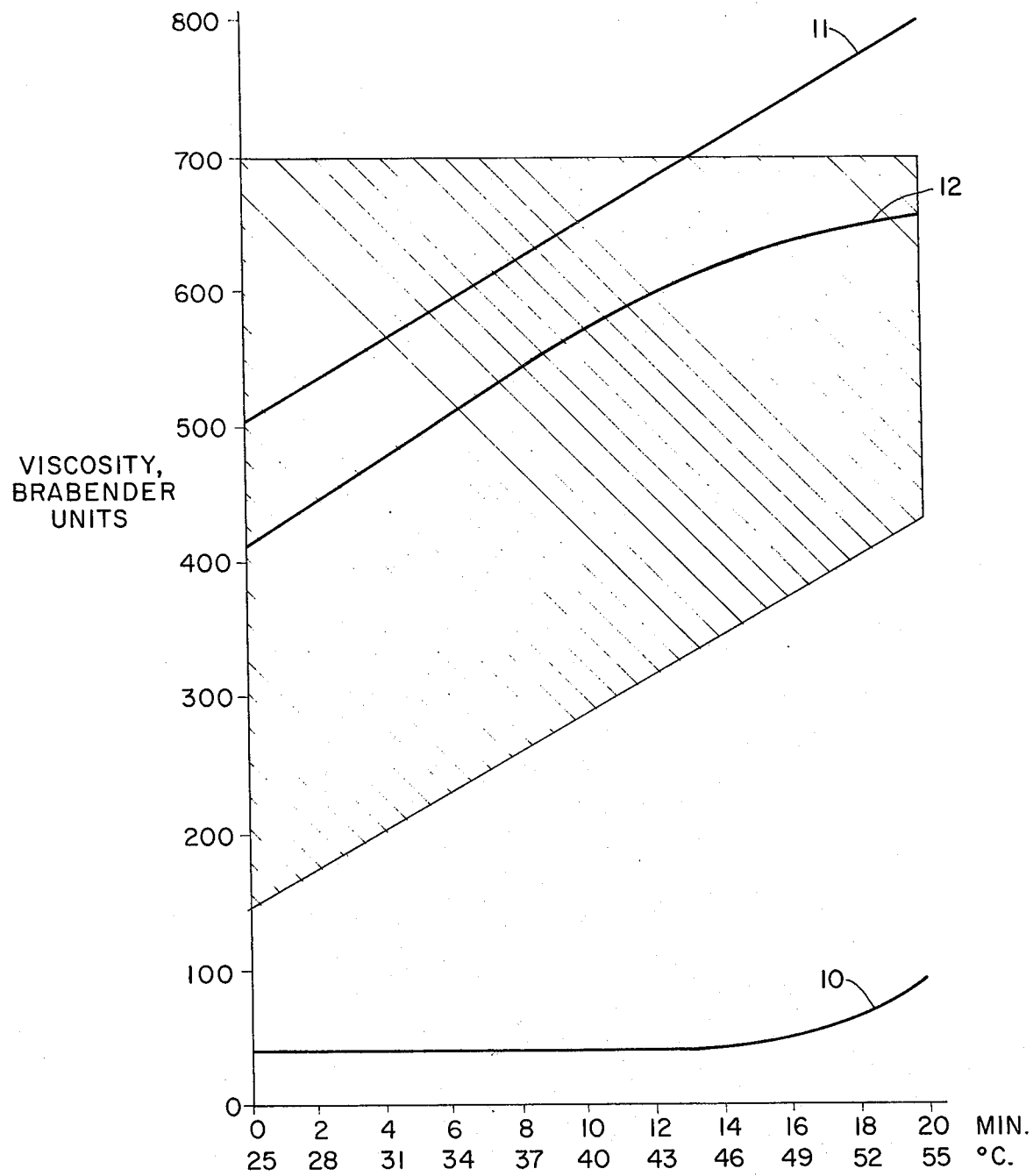

DECREASING THE RETROGRADED STARCH LEVEL AND INCREASING THE REHYDRATION RATE OF DEHYDRATED POTATO GRANULES

REFERENCE TO COPENDING APPLICATION

This application is a continuation of commonly assigned application Ser. No. 158,235, for DECREASING THE RETROGRADED STARCH LEVEL AND INCREASING THE REHYDRATION RATE OF DEHYDRATED POTATO GRANULES, filed June 30, 1971 in the names of Edward R. Purves and Charles O. Snively, now abandoned.

BACKGROUND OF THE INVENTION

Dehydrated potato preparation is essentially standard throughout the potato dehydration industry. Two basic processes are employed. One of the basic processes produces a dehydrated potato granule and is hereinafter referred to as the granule process; the other basic process produces a dehydrated potato flake and is hereinafter referred to as the flake process. The initial preparation for both the granule process and the flake process is essentially the same. Raw potatoes are washed, peeled, and then inspected to remove defective ones. The good potatoes are cut into slabs and fed into the cooking operation which is divided into two portions. The first is a precook in which the potato slabs are held for approximately 15 minutes in 160°F water. This partially cooks the potato and solubilizes some of the starch. Following the precook, the potato slabs are cooled in 60°F to 80°F water for about 15 minutes. This cooling may cause the solubilized starch to precipitate or crystallize out of solution. This loss of solubility is referred to as retrogradation. Crystallization of the free starch makes the potato less sticky and easier to handle during subsequent processing. In the next succeeding step the precooked and cooled quenched potato slabs are cooked in a steam cooker at about 200°F for from 15 minutes to 45 minutes. This cooking process gelatinizes the starch and prepares the potatoes for dehydration. It is at this point in the process, i.e. after obtaining the cooked potato mash, that the granule process and the flake process differ. The granulation process differs from the flake process in two important ways. First, the mashing step is more gentle and does not destroy tissue cells as does the ricer which is commonly utilized in a flaking process. Secondly, the dehydration step is much slower, causing retention of potato granules in the system for long periods of time. This long slow dehydration process can cause very important changes in the starch of the potato granules.

More specifically, the granule process differs most from the flaking process in the drying procedure employed. In the granule process, those granules which are first dried are recycled back into the stream of cooked mashed potatoes at a dry weight ratio of recycled granules to cooked mashed potatoes of about 9:1. The addition of the recycle step after the ordinary potato mashing step is one of the most unique facets of the granule process. The reason for the addback step, i.e. the recycle step, is that mashed potatoes cannot be conveniently dried directly by known methods. If such direct drying is attempted it is often observed that the mashed potatoes tend to dry only on the outer surfaces, forming a horny crust about the still-moist inner portions. However, when the addback step is applied the composite material forms a friable powder which can be readily dried to a uniform degree in dryers such as air-lift dryers to give resulting granules.

Turning now to the flaking process, in the conventional flaking process the initial steps are as previously described; the process begins to differ from the granules process only at the potato mash step. Subsequent to obtaining the potato mash, that mash is conveyed directly from the cooker through a ricer which forms it into smaller lump-like particles which are then conveyed directly to a drum dryer where they are rapidly drum dried to a moisture of about 7%. The particles are scraped from the dry dryer in the form of a dry sheet which is fractured to yield flakes.

Besides differing in processing, granules and flakes differ significantly in physical characteristics. For instance, potato flakes have a large portion of the potato cells wholly disrupted, whereas potato granules are comprised of largely intact cells. In addition, the differing drying procedures for flakes and granules results in significant differences with regard to the amount of available free starch present in each product.

Potato flakes, largely because they comprise disrupted potato cells, are found to have high levels of available free starch. However, potato granules undergo a process called retrogradation during the drying process wherein dried particles are continually recycled through the dryer. Retrogradation is a term utilized in the art to refer to starch which has been recrystallized in a form which is not water soluble. Potato granules contain a crusty outer surface which comprises retrograded starch. The retrograded starch prevents the effective release of significant amounts of free starch during subsequent reconstitution.

To summarize the difference between flakes and granules, potato flakes are flat platelets and potato granules are small hard spheroidal shaped particles. Granules are considered to be intact individual potato tissue cells, whereas flakes have a substantial amount of cell rupture. Flakes upon reconstitution release an abundance of free starch; on the other hand, granules upon reconstitution are notably lacking in free starch content.

For most uses the principal difference between flakes and granules, i.e. granules have a substantial amount of retrogradation, consequently a low amount of available free starch during reconstitution whereas flakes have little or no retrogradation and a substantial availability of free starch, makes little difference. However, in recent years a newly found utility for dehydrated potatoes has been to utilize such dehydrated potatoes to make reconstituted dough sheets which are subsequently cut into presized portions and fried to give snack chip products. For examples of such processes wherein reconstituted doughs formed from dehydrated potatoes are utilized to prepare fried snack food chips, see, for example, Benson et al., U.S. Pat. No. 3,539,356, issued Nov. 10, 1970, and MacKendrick, U.S. Pat. No. 3,520,248, issued July 14, 1970, as well as Baur et al., U.S. Pat. No. 3,498,798, issued Mar. 3, 1970, and Liepa, U.S. Pat. No. 3,576,647, issued Apr. 27, 1970. In all of the processes described in each of the above identified patents, while the resulting food products may differ in eating and/or textural characteristics, the one common theme is that in each instance the snack food product is prepared from a dough sheet which itself is prepared at least in part from reconstituted dehydrated potatoes. In these processes it has been found essential that the dough sheet be formed from potato sources having a substantial amount of available free starch which can act as a binder material to hold the dough sheet in a coherent workable dough sheet form. In the absence of available free starch, non-potato binder materials must be utilized. Of course the utilization of non-potato binder material is undesirable because of certain commercial as well as legal considerations.

Flaked dehydrated potatoes, as one might expect, function quite well in preparing coherent workable dough sheets for use in forming snack food chips. This is so because, as previously explained, potato flakes have a substantial amount of cell rupture and accordingly a substantial amount of available free starch. On the other hand, as one might expect, potato granules because of their high level of retrograded starch have a significantly decreased level of available free starch for use as binders in forming coherent workable dough sheets and accordingly to date no known process has enabled one to make a coherent workable dough sheet from all granules which will produce a satisfactory resulting snack chip.

Accordingly, it is the object of this invention to provide a process of treating dehydrated potato granules so that they can be used as a source of dehydrated potatoes in preparing dough sheets suitable for cutting into predetermined sizes and frying to give excellent chips.

It has also been found that potato granules rehydrate at a significantly slower level than potato flakes, and it is an object of the process of this invention to provide potato granules having an increased rehydration rate.

These and other objects will become apparent from the description of the invention.

SUMMARY OF THE INVENTION

This invention relates to a process of substantially increasing the available free starch in potato granules. Correspondingly, the level of retrograded starch is substantially decreased. In addition, the rehydration rate of potato granules is significantly increased. In its broadest sense the process comprises mixing granules and hot water to provide a reconstituted mixture and rapidly drying that mixture. The reconstituted mixture preferably comprises a ratio of granules to hot water of from 1:1.5 to 1:5, and the hot water is preferably at a temperature of from 140°F to 210°F. In a preferred embodiment the rapid drying is accomplished by a drum dryer.

BRIEF DESCRIPTION OF THE DRAWING

The FIGURE is a graph showing amylograph viscosity measurements for conventional granules, granules treated in accord with the process of this invention, and flakes. In addition, the FIGURE shows an area of amylograph viscosities, measured in Brabender units, suitable for preparation of excellent coherent workable dough sheets which in turn can be utilized to prepare pre-shaped portions adaptable for frying to yield snack food chips.

DETAILED DESCRIPTION OF THE INVENTION

The process of this invention involves the discovery that the retrograded starch level of dehydrated potato granules can be decreased and the rehydration rate of potato granules can be increased by a process comprising mixing granules and hot water to provide a reconstituted mixture, and rapidly drying that mixture. This phenomenon is surprising considering the fact that granulation often involves a conditioning or tempering of moist potato mashes at certain specified temperatures which are believed to cause an increase in retrograded starch levels, and accordingly a granule of superior texture. Further, considering that the granules already contain retrograded starch which has been crystallized in an insoluble form, it is unexpected that merely the addition of water coupled with mixing and rapid drying would reconvert that retrograded starch to a soluble starch form.

The prior art, namely, Kueneman et al., U.S. Pat. No. 3,085,019, issued Apr. 9, 1963, suggests that potato granules themselves can be modified by a careful control of temperature, time, moisture, and humidity contents. However, the conditions shown in the Kueneman patent are found to be inoperable in the present invention. For example, it is essential to the process of this invention that the moisture level during the formation of the reconstituted mixture comprise at least about 60% by weight of moisture, whereas the maximum amount of moisture shown in the Kueneman patent is 50% by weight.

In the first step of the process of this invention, conventional untreated potato granules prepared in accord with the common methods of preparation previously described are mixed with hot water to provide a reconstituted mixture. It is essential if the retrograded starch level is to be decreased that the ratio of granules to water in the reconstituted mixture be at least 1:1.5. In the event that lower moisture levels are utilized, extreme difficulty in application to dryers occurs. Preferably, the granule to water ratio is from 1:1.5 to 1:5, and most preferably from 1:2 to 1:4. Where amounts of moisture in excess of the ratio 1:5 of granules to water are employed, the reconstituted mixture becomes too soupy and contains too much water for use; and, in addition, the process becomes extremely inefficient in that all of the excess water must be removed during the hereinafter explained drying step.

The hot water employed in providing the reconstituted mixture should preferably have a temperature of from 140°F to 210°F and most preferably within the range of from 180°F to 210°F. If water at a temperature of less than 140°F is employed in preparing the reconstituted mixture, it has been found that the level of retrograded starch may not be significantly decreased by the process of this invention and the addition of heat input at later processing steps may be necessary as well as longer process times. On the other hand, the upper limit of 210°F is merely a practical one. For best operating conditions the hot water employed in the reconstituting procedure should be within the most preferred temperature range of 180°F to 210°F.

No criticality exists with regard to the time of mixing of the reconstituted mixture, but preferably mixing should continue for at least 10 minutes. A practical upper time limit on mixing is one hour for little or no advantage is gained when mixing beyond this maximum time limit. Any of the well known mixing devices can be employed in this procedure such as Hobart mixers, baffle mixers, paddle mixers, and the like.

In the final step of the process of this invention the reconstituted mixture is rapidly dried to yield a product having a decreased retrograded starch level and an increased rehydration rate when compared to conventional dehydrated potato granules not treated in accord with the process of this invention. It is important to note that the final drying procedure is characterized as a rapid drying procedure. While no precise criticality exists with regard to the specific drying technique employed, it is important that the reconstituted mixture not remain in the drying zone for long periods of time, for, if such occurs, the retrograded starch level will substantially increase. Preferably, the residence time within the drying zone for any particular portion of the reconstituted mixture is from 10 seconds to 2 minutes. 10 seconds is about the minimum amount of time for any known drying technique to reach satisfactory final moisture contents. Generally, if any portion of the reconstituted mixture remains within the drying zone above approximately 2 minutes, it has been found that the retrograded starch level begins to increase and continues to increase rapidly with longer residence times in the drying zone. It should be understood that these residence time limitations for the drying zone are given only as guidelines, and that the important factor to always be considered is that drying must be as rapid as possible in order to avoid significant increases in retrograded starch levels.

Suitable dryers can be selected from those well known drying devices such as fluidized bed dryers, scraped wall heat exchangers, drum dryers, and the like. A particularly preferred dryer is a drum dryer. The use of drum dryers is known in the potato industry, it having been found to have excellent utility in conventional potato flake processing.

Where a drum dryer is employed, the reconstituted mixture is fed to the top surface of the drum by conveying means. Small diameter unheated rolls progressively apply fresh reconstituted mixture to portions already on the drum which are partially dried, thus building up a dense sheet. Peripheral speed of the small rolls is the same as that of the drum, and after traveling around the circumference of the drum a doctor knife removes the dried sheet by peeling the dried sheet away from the drum. Typically, a single-stage drum dryer may have from 5 to 8 small rolls placed around the circumference of the larger drum dryer. The drum dryer itself is heated to temperatures within the range of from 300°F to 370°F by pressurized steam contained within the drum at pressures of from 20 to 150 psig. For optimum results the drum dryer should be rotating at a speed of from 1 to 20 rpm, and commonly from 3 to 8 rpm. Such rotational speeds provide satisfactory residence time for the reconstituted mixture within the drying zone.

The final moisture content after drying can be regulated depending upon the exact textural qualities desired; however, most commonly dehydrated potatoes have a moisture content of from 5% by weight to 12% by weight, and, most preferably, from 6% by weight to 10% by weight.

Turning now to a description of the result of the process of this invention, the decrease in the retrograded starch level and the increase in the rehydration rate will be demonstrated in connection with the graph shown in the FIGURE. The amount of retrograded starch which determines the amount of available free starch, as well as the rehydration rate of potato granules, has been found to correlate with viscosity measurements of certain slurries of the resulting potato granules. More particularly, if the amount of retrograded starch is low, the amount of available free starch is high. The free starch when wetted becomes sticky and tacky, and the more free starch, the more viscous the slurry becomes. Consequently a measure of the viscosity provides an indication of the amount of free starch and correspondingly the level of retrograded starch. These viscosity measurements which demonstrate the rehydration rate and the retrograded starch level are measured by an amylograph viscosity test. The resulting viscosity is measured in Brabender units, which is an arbitrary unit of viscosity measurement roughly corresponding to centipoises. In conducting the amylograph tests, each example is prepared in exactly the same way. Forty grams of the sample are run through a micropulverizer which is a size reduction device which does not impart shear forces to provide an average particle size of 100 microns. The sample is mixed with 420 grams of water at room temprature to provide a slurry and placed in a bowl which is rotatably mounted on the amylograph. The bowl rotates at approximately 75 rpm and feelers which are suspended on a shaft above the rotatably mounted bowl are immersed in the slurry. The feelers are mounted in stationary fashion and as the bowl gradually rotates the permanently mounted feelers are distorted from their right angle position with respect to the slurry. The amount of distortion of each feeler is directly proportional to the viscosity of the material contained in the rotatably mounted bowl. The amount of distortion of the feelers is recorded by the instrument and plotted on graph paper to provide an amylogram. The amylograph is connected to a thermal regulator which allows the temperature to gradually rise from 25° to 55°C over a 20minute period of time. The thermal regulator allows the temperature to be increased 1.5°C per minute. During this period of time the amylograph is constantly measuring the slurry viscosity.

As the viscosity measured in Brabender units increases, the material becomes more viscous because heating releases more free starch. A measure of the rehydration rate can be obtained by examining the slope of a curve as shown in the FIGURE which plots the viscosity, measured in Brabender units, against the run time measured in minutes as the temperature increases 1.5° per minute.

Looking at the graph shown in FIGURE, line 10 represents an amylograph run for ground potato granules which were not subjected to the process of this invention. Line 11 represents an amylograph run for a typical dehydrated potato flake. Line 12 represents a typical amylograph run for potato granules which have been subjected to the process of this invention.

Analysis of many amylograms of potato granules which were not subjected to the process of this invention, amylograms of potato granules which were subjected to the process of this invention, and amylogram of potato flakes have led to the following conclusions: (1) No sample with an initial amylograph viscosity of less than 150 Brabender units can be utilized to successfully prepare a coherent workable dough sheet which is suitable for subsequent sizing and frying to produce a good quality snack chip product. (2) All samples of conventional potato granules not treated in accord with the process of this invention have an initial amylograph viscosity of less than 150 Brabender units. (3) Subjection of potato granules to the reconstitution rapid drying procedure of this invention will provide an initial amylograph viscosity of between 150 Brabender units and 700 Brabender units. In addition, the sample's amylograph will have a slope, which is a measure of the rapidity of the rehydration rate, of at least 18 Brabender units per minute. (4) All samples which have been subjected to the process of this invention to provide an initial viscosity of 700 Brabender units or greater, are capable of being utilized with success to form a coherent workable dough sheet which can be subsequently pre-sized, shaped, and fried as long as the amylograph curve slope is not negative.

All potato granules treated in accord with the process of this invention at least have an amylograph viscosity curve falling wholly within or above the hatched area defined in the graph of the FIGURE. These samples are especially suitable for use in preparing snack food chips because they have an initial viscosity of 150 Brabender units or greater and a rapid rehydration rate, i.e. a slope of at least 18 Brabender units per minute per 1.5°C temperature rise. In addition, samples having an initial viscosity of at least 700 Brabender units are all suitable for the purpose of this invention provided they do not have a negative slope.

Further examination of the FIGURE reveals that the retrograded starch level of a typical granule processed in accord with this invention can be brought to a level equal to that of a typical flake 11, and that the retrograded starch level of ground granules which have not been subjected to the process of the invention are unsatisfactory as evidenced by line 10. In addition, the slope of line 10 is substantially smaller than 18 Brabender units per minute per 1.5°C, indicating that granules not treated in accord with the process of this invention have an unsatisfactory rehydration rate.

The following Examples are offered to further illustrate the process of this invention.

EXAMPLE 1

22 pounds of conventionally processed potato granules having an amylograph corresponding to line 10 of the FIGURE were reconstituted with 66 pounds of hot tap water. The estimated temperature of the tap water was approximately 140°F, and the ratio of granules to water in the reconstituted mixture was 1:3. The reconstituted mixture was mixed for 15 minutes to provide a mash similar to that of whole cooked potatoes. The reconstituted mixture was then dried using a pilot plant drum dryer. The drum steam pressure was 40 psi and the drum was rotating at 2½ rpm. The dried flakes had a moisture content of about 8%, and the estimated time period for any portion of the reconstituted mixture within the drying zone was about 30 seconds. Thereafter, the product treated in accord with the process of this invention was pulverized through a micropulverizer to an average particle size of 100 microns, and amylograph testing in accord with the procedures previously given herein showed that the entire amylograph fell within or above the hatched area of the FIGURE, indicating that the product was characterized by rapid rehydration and a low level of retrograded starch.

Substantially similar results with those indicated above were obtained when a 20 pound sample of conventional granules was utilized with 60 pounds of water at a temperature of 210°F and wherein the mixing time was 15 minutes.

The other two treated dehydrated potato products previously mentioned in this Example, which had amylographs falling wholly within the hatched area of the graph shown in the FIGURE, when mixed with 666.5 grams of treated dehydrated potato and 429 grams of water with respect to the former, and 605 grams of pulverized treated dehydrated potato granules and 390 grams of water with respect to the latter, formed excellent coherent workable dough sheets when passed through a roller mill. These sheets upon sizing and shaping and frying in vegetable oil at 340°F for approximately 15 seconds formed snack chips of excellent quality.

EXAMPLE 2

Samples 1 through 4 of conventional granules were mixed under the conditions set forth in the Table hereinafter, and rapidly drum-dried under the conditions set forth in Table I below.

TABLE I

| Run | Granules (Lbs.) | H₂O (Lbs.) | Mix Time and Temp. | Drum Speed | Steam Pressure | Drying Time | Final Moisture |
|---|---|---|---|---|---|---|---|
| 1 | 50 | 50 | 15 min., 140°F | (run aborted - could not dry) | | | |
| 2 | 30 | 70 | 15 min., 140°F. | 4 | 60 psig | 30 sec. | 7.8% |
| 3 | 20 | 80 | 15 min., 140°F. | 3.5 | 60 psig | 30 sec. | 6.2% |
| 4 | 25 | 75 | 15 min., 140°F. | 3.5 | 60 psig | 30 sec. | 7.0% |

Samples 2, 3, and 4 were submitted for amylograph viscosity measurements to determine the levels of retrograded starch and the rehydration rate. The following Table, Table II, shows the results of the amylograph viscosity measurements for samples 2, 3, and 4, as well as a sample of the untreated granules which is presented herein as a standard.

TABLE II

| Run | Brabender Units at 25°F | Brabender Units at 55°F |
|---|---|---|
| Standard | 15 | 15 |
| No. 2 | 620 | 930 |
| No. 3 | 420 | 810 |
| No. 4 | 500 | 940 |

As can be seen, the standard which represented the supply source, is wholly unsatisfactory from the standpoint of retrograded starch level and rehydration rate. Each of samples 2, 3, and 4 give amylograph viscosity curves falling within or partially above the hatched area of the graph shown in the FIGURE, indicating they have low retrograded starch levels, high levels of available free starch to act as binder materials in forming dough sheets, and have a rapid rehydration rate. 498.4 grams of sample No. 2 was combined with 322.5 grams of water and 4.13 grams of monoglyceride emulsifier and mixed and run through a roller mill to provide a uniform coherent workable dough sheet. That dough sheet was sized and shaped into chip-like ovals and fried in 340°F oil to provide a snack chip substantially indistinguishable in all respects from snack chips prepared from flaked dehydrated potatoes when used at equivalent levels.

What is claimed is:

1. A process of decreasing the retrograded starch level and increasing the rehydration rate of dehydrated potato granules comprising; mixing said dehydrated potato granules and hot water of a temperature of from 140°F to 210°F for from 10 minutes to 1 hour to provide a reconstituted mixture wherein the ratio of said granules to said water is from 1:1.5 to 1:5, and rapidly drying said mixture in from 10 seconds to 2 minutes to a moisture content of from 5% to 12% by weight.

2. The process of claim 1 wherein the ratio is from 1:2 to 1:4.

3. The process of claim 1 wherein the hot water is at a temperature of from 180°F to 200°F.

4. The process of claim 1 wherein the rapid drying is drum drying.

5. The process of claim 1 wherein the dried reconstituted mixture moisture content is from 6% by weight to 10% by weight.

* * * * *

UNITED STATES PATENT AND TRADEMARK OFFICE
CERTIFICATE OF CORRECTION

PATENT NO. : 3,917,866
DATED : November 4, 1975
INVENTOR(S) : Edward Robert Purves and Charles Oscar Snively It is certified that error appears in the above-identified patent and that said Letters Patent are hereby corrected as shown below:

Column 7, line 64, "666.5 grams" should be -- 665.5 grams --

Signed and Sealed this second Day of March 1976

[SEAL]

Attest:

RUTH C. MASON
*Attesting Officer*

C. MARSHALL DANN
*Commissioner of Patents and Trademarks*